United States Patent
Gheorghiu et al.

(10) Patent No.: US 6,897,698 B1
(45) Date of Patent: May 24, 2005

(54) PHASE SHIFTING AND PWM DRIVING CIRCUITS AND METHODS

(75) Inventors: Virgil Ioan Gheorghiu, Campbell, CA (US); Da Liu, San Jose, CA (US)

(73) Assignee: O2Micro International Limited, Grand Cayman (KY)

( * ) Notice: Subject to any disclaimer, the term of this patent is extended or adjusted under 35 U.S.C. 154(b) by 0 days.

(21) Appl. No.: 10/448,496

(22) Filed: May 30, 2003

(51) Int. Cl.$^7$ ............................................. H03K 11/16
(52) U.S. Cl. ........................ 327/231; 327/257; 327/258
(58) Field of Search ................................ 327/172, 175, 327/254, 255, 256, 257, 258, 259, 231, 232, 233, 236

(56) References Cited

U.S. PATENT DOCUMENTS

| | | | | |
|---|---|---|---|---|
| 3,855,520 | A | * 12/1974 | Stich ........................... | 323/283 |
| 4,017,744 | A | * 4/1977 | Johnson ....................... | 327/172 |
| 4,050,006 | A | * 9/1977 | Stich ........................... | 363/98 |
| 4,247,890 | A | * 1/1981 | Cutler et al. ................. | 363/137 |
| 4,258,416 | A | * 3/1981 | Walker et al. ............... | 363/137 |
| 4,418,406 | A | * 11/1983 | Ogawa ...................... | 369/59.17 |
| 4,461,980 | A | 7/1984 | Nilssen ........................ | 315/225 |
| 4,535,399 | A | 8/1985 | Szepesi ........................ | 363/20 |
| 4,541,041 | A | 9/1985 | Park et al. .................... | 363/41 |
| 4,727,469 | A | 2/1988 | Kammiller .................... | 363/56 |
| 4,763,239 | A | 8/1988 | Ball ........................... | 363/98 |
| 4,794,506 | A | 12/1988 | Hino et al. .................... | 363/25 |
| 4,814,962 | A | 3/1989 | Magalhes et al. ............. | 363/16 |
| 4,833,584 | A | 5/1989 | Divan ......................... | 363/37 |
| 4,855,888 | A | 8/1989 | Henze et al. ................. | 363/132 |
| 4,860,189 | A | 8/1989 | Hitchcock .................... | 363/132 |
| 4,864,483 | A | 9/1989 | Divan ......................... | 363/37 |
| 4,912,622 | A | 3/1990 | Steigerwald et al. .......... | 363/98 |
| 4,935,857 | A | 6/1990 | Nguyen et al. ................ | 363/17 |
| 4,952,849 | A | 8/1990 | Fellows et al. ............. | 315/307 |
| 4,953,068 | A | 8/1990 | Henze .......................... | 363/17 |

(Continued)

OTHER PUBLICATIONS

An Introduction to the Principles and Features of Resonant Power Conversion, Steve Freeland, from Recent Developments in Resonant Power Conversion, Intertec Communications, Inc., 1988, pp. 20–43, No Date.

Zero–Voltage Switching Techniques in DC/DC Converters, Kwang–Hwa Liu and Fred C. Lee, from Recent Developments in Resonant Power Conversion, Intertec Communications, Inc., 1988, pp. 211–223, No Date.

"A New and Improved Control Technique Greatly Simplifies the Design of ZVS Resonant Inverters and DC/DC Power Supplies", Mehmet K. Nalbant, 1995 IEEE pp. 694–701, No date.

Swtiching Power Supply Design, Abraham I. Pressman, McGraw–Hill, 1991, pp. 93–104; 471–492, No date.

"Phase Shifted, Zero Voltage Transition Design Considerations and the UC3875 PWM Controller", by Bill Andreycak, Unitrode, Application Note, May 1997, pp. 1–14.

"Fixed–Frequency, Resonant–Switched Pulse Width Modulation with Phase–Shifted Control", by Bob Mammano and Jeff Putsch, from Power Supply Design Seminar, Unitrode, 1991, pp. 5–1 to 5–7.

(Continued)

*Primary Examiner*—Tuan T. Lam
*Assistant Examiner*—Hiep Nguyen
(74) *Attorney, Agent, or Firm*—Grossman, Tucker, Perreault & Pfleger, PLLC

(57) ABSTRACT

The present invention provides an inverter controller comprising a drive circuit that generates a plurality of switch drive signals for inverter applications. In some exemplary embodiments, the drive circuit operates by reversing the command level of an error signal. In other embodiments, the drive circuit operates by using a half period of a sawtooth signal. In still other embodiments, the drive circuit operates by using a double period opposite shifting pulses method. The present invention also provides a PWM signal generator circuit that generates periodic PWM switch drive signals symmetrical to the minimum or maximum of a sawtooth waveform.

4 Claims, 16 Drawing Sheets

U.S. PATENT DOCUMENTS

| | | | | |
|---|---|---|---|---|
| 4,992,919 | A | 2/1991 | Lee et al. | 363/17 |
| 5,012,058 | A | 4/1991 | Smith | 219/10.55 |
| 5,017,800 | A | 5/1991 | Divan | 307/66 |
| 5,027,263 | A | 6/1991 | Harada et al. | 363/16 |
| 5,027,264 | A | 6/1991 | Dedoncker et al. | 363/16 |
| 5,105,127 | A | 4/1992 | Lavaud et al. | 315/291 |
| 5,113,334 | A | 5/1992 | Tuson et al. | 363/25 |
| 5,132,888 | A | 7/1992 | Lo et al. | 363/17 |
| 5,132,889 | A | 7/1992 | Hitchcock et al. | 363/17 |
| 5,157,592 | A | 10/1992 | Walters | 363/17 |
| 5,198,969 | A | 3/1993 | Redl et al. | 363/17 |
| 5,208,740 | A | 5/1993 | Ehsani | 363/124 |
| 5,231,563 | A | 7/1993 | Jitaru | 363/98 |
| 5,235,501 | A | 8/1993 | Stuart et al. | 363/17 |
| 5,268,830 | A | 12/1993 | Loftus, Jr. | 363/17 |
| 5,285,372 | A | 2/1994 | Huynh et al. | 363/132 |
| 5,291,382 | A | 3/1994 | Cohen | 363/16 |
| 5,305,191 | A | 4/1994 | Loftus, Jr. | 363/17 |
| 5,363,020 | A | 11/1994 | Chen et al. | 315/209 |
| 5,384,516 | A | 1/1995 | Kawabata et al. | 315/160 |
| 5,402,329 | A | 3/1995 | Wittenbreder, Jr. | 363/16 |
| 5,412,557 | A | 5/1995 | Lauw | 363/37 |
| 5,418,703 | A | 5/1995 | Hitchcock et al. | 363/17 |
| 5,420,779 | A | 5/1995 | Payne | 363/56 |
| 5,422,546 | A | 6/1995 | Nilssen | 315/219 |
| 5,430,632 | A | 7/1995 | Meszlenyi | 363/17 |
| 5,430,641 | A | 7/1995 | Kates | 363/133 |
| 5,448,155 | A | 9/1995 | Jutras | 323/285 |
| 5,448,467 | A | 9/1995 | Ferreira | 363/17 |
| 5,481,160 | A | 1/1996 | Nilssen | 315/209 |
| 5,510,974 | A | 4/1996 | Gu et al. | 363/134 |
| 5,514,921 | A | 5/1996 | Steigerwald | 307/125 |
| 5,546,300 | A | 8/1996 | Lee et al. | 363/132 |
| 5,559,688 | A | 9/1996 | Pringle | 363/89 |
| 5,615,093 | A | 3/1997 | Nalbant | 363/25 |
| 5,619,402 | A * | 4/1997 | Liu | 363/20 |
| 5,638,260 | A | 6/1997 | Bees | 363/17 |
| 5,646,836 | A | 7/1997 | Sadarnac et al. | 363/98 |
| 5,669,238 | A | 9/1997 | Devers | 62/657 |
| 5,684,683 | A | 11/1997 | Divan et al. | 33/65 |
| 5,694,007 | A | 12/1997 | Chen | 315/247 |
| 5,712,533 | A | 1/1998 | Corti | 315/169.3 |
| 5,715,155 | A | 2/1998 | Shanani et al. | 363/132 |
| 5,719,474 | A | 2/1998 | Vitello | 315/307 |
| 5,719,759 | A | 2/1998 | Wagner et al. | 363/132 |
| 5,731,652 | A | 3/1998 | Shimada | 310/316 |
| 5,736,842 | A | 4/1998 | Jovanovic | 323/222 |
| 5,742,495 | A | 4/1998 | Barone | 363/65 |
| 5,742,496 | A | 4/1998 | Tsutsumi | 363/95 |
| 5,744,915 | A | 4/1998 | Nilssen | 315/209 |
| 5,748,457 | A | 5/1998 | Poon et al. | 363/16 |
| 5,764,494 | A | 6/1998 | Schutten et al. | 363/17 |
| 5,774,346 | A | 6/1998 | Poon et al. | 363/17 |
| 5,781,418 | A | 7/1998 | Chang et al. | 363/16 |
| 5,781,419 | A | 7/1998 | Kutkut et al. | 363/17 |
| 5,784,266 | A | 7/1998 | Chen | 363/16 |
| 5,796,598 | A | 8/1998 | Nowak et al. | 363/37 |
| 5,818,172 | A | 10/1998 | Lee | 315/86 |
| 5,834,889 | A | 11/1998 | Ge | 313/493 |
| 5,844,540 | A | 12/1998 | Terasaki | 345/102 |
| 5,854,617 | A | 12/1998 | Lee et al. | 345/102 |
| 5,856,916 | A | 1/1999 | Bonnet | 363/20 |
| 5,875,103 | A | 2/1999 | Bhagwat et al. | 363/17 |
| 5,880,940 | A | 3/1999 | Poon | 363/20 |
| 5,886,477 | A | 3/1999 | Honbo et al. | 315/209 |
| 5,886,884 | A | 3/1999 | Baek et al. | 363/48 |
| 5,894,412 | A | 4/1999 | Faulk | 363/56 |
| 5,910,709 | A | 6/1999 | Stevanovic et al. | 315/225 |
| 5,917,722 | A | 6/1999 | Singh | 363/132 |
| 5,923,129 | A | 7/1999 | Henry | 315/307 |
| 5,930,121 | A | 7/1999 | Henry | 363/16 |
| 5,932,976 | A | 8/1999 | Maheshwari et al. | 315/291 |
| 5,939,830 | A | 8/1999 | Praiswater | 315/DIG. 4 |
| 5,946,200 | A | 8/1999 | Kim et al. | 363/17 |
| 5,991,169 | A * | 11/1999 | Kooken | 363/17 |
| 6,011,360 | A | 1/2000 | Gradzki et al. | 315/244 |
| 6,051,940 | A | 4/2000 | Arun | 315/307 |
| 6,111,216 | A * | 8/2000 | Stava | 219/130.51 |
| 6,114,814 | A | 9/2000 | Shannon et al. | 315/219 |
| 6,151,232 | A | 11/2000 | Furuhashi et al. | 363/97 |
| 6,157,243 | A * | 12/2000 | Tailliet | 327/536 |
| 6,259,615 | B1 * | 7/2001 | Lin | 363/98 |
| 6,396,722 | B2 | 5/2002 | Lin | 363/98 |
| 6,448,838 | B1 * | 9/2002 | Heim et al. | 327/365 |
| 6,501,234 | B2 * | 12/2002 | Lin et al. | 315/307 |
| 6,531,831 | B2 * | 3/2003 | Chou et al. | 315/225 |
| 6,559,606 | B1 | 5/2003 | Chou et al. | 3515/194 |
| 6,608,521 | B1 * | 8/2003 | Baldwin et al. | 330/10 |
| 6,804,129 | B2 * | 10/2004 | Lin | 363/98 |
| 6,809,938 | B2 * | 10/2004 | Lin et al. | 363/17 |
| 6,819,011 | B2 * | 11/2004 | Kernahan et al. | 307/35 |

OTHER PUBLICATIONS

"Zero Voltage Switching Resonant Power Conversion", by Bill Andreycak, from Power Supply Design Seminar, Unitrode, 1991, pp. A2–1 to A2–24; and A2–1A to A2–3A, No Date.

"Resonant Mode Converter Topologies", by Bob Mammano, from Power Supply Design Seminar, Unitrode, 1991, pp. P3–1 to P3–12, No Date.

The New UC3879 Phase–Shifed PWM Controller Simplifies the Design of Zero Voltage Transition Full–Bridge Converters by Laszlo Balogh, Unitrode, Application Note, 1995, pp. 1–8, No Date.

"A Comparative Study of a Class of Full–Bridge Zero–Voltage–Switched PWM Converters", by W. Chen et al., 1995 IEEE, pp. 893–899, No Date.

Optimum ZVS Full–Bridge DC/DC Converter with PWM Phase–Shift Control: Analysis, Design Considerations, and Experimental Results, by Richard Red I et al., 1994 IEEE, pp. 159–165, No Date.

A Frequency/PWM Controlled Converter with Two Independently Regulated Outputs, by R. A. Fisher et al., HFPC, May 1989, pp. 459–471.

High Density Power–Hybrid Design of a Half–Bridge Multi–Resonant Converter, by Richard Farrington, et al., HFPC–Virginia Polytechnic Institute, May 1990, pp. 26–33.

Small–Signal Analysis of the Zero–Voltage Switched Full–Bridge PWM Converter, V. Vlatkovic et al., HFPC–Virginia Polytechnic Institute, May 1990, 262–272.

Feasible Characteristics Evaluation of Resonant Tank PWM Inverter–Linked DC–DC High–Power Converters for Medical–Use High–Voltage Application, by H. Takano et al., 1995 IEEE, pp. 913–919, No Date.

Advanced Power Technology, "A New Generation of Power MOSFET Offers Improved Performance at Reduced Cost", by Ken Dierberger, 2001.

* cited by examiner

PHASE SHIFTING AND PWM DRIVING CIRCUITS AND METHODS

FIELD OF THE INVENTION

The present invention relates to driving techniques for inverter circuits, and more particularly to phase-shifting and PWM circuits and methods used for driving circuitry in full bridge and half bridge inverter applications.

BACKGROUND OF THE INVENTION

FIG. 1 shows the schematic of the "H" bridge switches A, B, C and D and the associated load. The four pulses used to command the "H" bridge are rectangular, have d=50% duty cycle and two of them (A or B and C or D) are Phase shifted with respect to a corresponding switch to adjust the on-times of corresponding switches (i.e., A and D, or B and C) to thereby adjust power delivered to the load. The four pulses can also be pulse-width modulated signals. The sequence to command the four switches allows the current to flow in first diagonal (A/D), discharges the energy accumulated in load, allows the current to flow in second diagonal (B/C), and discharges the energy accumulated in load. It then repeats the above sequence for the next cycle. The current flow on A/D or B/C diagonal during the overlap time (i.e., phase) between the switch A and switch D respectively switch B and switch C dictates power delivered to the load.

SUMMARY OF THE INVENTION

In one aspect, the present invention provides numerous exemplary phase shifting techniques for generating a phase shift between the switches in an H-Bridge circuit.

In one exemplary embodiment, an inverter controller is provided comprising a drive circuit that generates a plurality of switch drive signals by reversing the command level of an error signal, said drive circuit comprising:

an oscillator circuit generating a first and second complimentary clock pulses and a sawtooth signal;

a break-before-make circuit receiving said first and second complimentary clock pulses and generating a first and second switch drive signals;

a first comparator comparing an error signal and said sawtooth signal, and a second comparator comparing a compliment of said error signal and said sawtooth signal; and a phase generating circuit receiving the outputs of said first and second comparators and generating a third and fourth drive switch drive signals, said third and fourth switch drive signals having a phase with respect to said first and second switch drive signals, respectively, said phase determined by said error signal.

In another exemplary embodiment, an inverter controller is provided comprising a drive circuit that generates a plurality of switch drive signals using a half period of a sawtooth signal, said drive circuit comprising:

an oscillator circuit generating a first and second complimentary clock pulses;

a floating capacitor coupled to said oscillator circuit and generating a half period sawtooth signal;

a break-before-make circuit receiving said first and second complimentary clock pulses and generating a first and second switch drive signals;

a comparator comparing an error signal and said half period sawtooth signal; and a phase generating circuit receiving the output of said comparator and generating a third and fourth drive switch drive signals, said third and fourth switch drive signals having a phase with respect to said first and second switch drive signals, respectively, said phase determined by said error signal.

In still another exemplary embodiment, an inverter controller is provided comprising a drive circuit that generates a plurality of switch drive signals using a double period opposite shifting pulses method, said drive circuit comprising:

an oscillator circuit generating a square wave clock pulse and a sawtooth signal;

a comparator comparing said sawtooth signal to an error signal;

a first edge detector receiving the output of said first comparator and generating a first clock pulse upon a transition of said output of said first comparator;

a first flip flop circuit receiving said square wave clock pulse and said clock pulse and generating a first and second switch drive signals;

an inverter receiving the output of said comparator and generating an inverted output signal;

a second edge detector receiving the output of said inverter and generating a second clock pulse upon a transition of said output signal of said inverter;

a second flip flop circuit receiving said square wave clock pulse and said second clock pulse and generating a third and fourth switch drive signals;

said third and fourth switch drive signals having a phase with respect to said first and second switch drive signals, respectively, said phase determined by said error signal.

In another aspect, the present invention provides a PWM signal generator circuit generating periodic PWM switch drive signals symmetrical to the minimum or maximum of a sawtooth waveform, said generator circuit comprising:

an oscillator circuit generating a square wave clock signal and a symmetrical sawtooth signal;

a MINMAX circuit generating a signal proportional to an input error signal that is clamped between a predefined minimum and maximum value;

a comparator circuit receiving the output of said MINMAX circuit and said sawtooth signal and generating a PWM signal having a duty cycle determined by the value of said error signal;

a flip flop circuit receiving said clock signal and generating a pulse signal and a complimentary pulse signal;

a first gate receiving said PWM signal and said pulse signal and generating a first switch drive signal; and a second gate receiving said PWM signal and said complimentary pulse signal.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited as only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF EXEMPLARY EMBODIMENTS

The following Detailed Description describes embodiments related to driving circuits for an H-Bridge circuit and pulse width modulator circuits for both full bridge (H-Bridge) and half bridge inverter topologies. It is to be understood at the outset that one skilled in this art is familiar with inverter topologies of this type, as provided in, for example, U.S. Pat. No. 6,259,615, hereby incorporated by reference.

I. Driving Circuits Using Phase Shifting Techniques

A. Reversing the Saw Tooth Waves of the Oscillator

Figure 1:
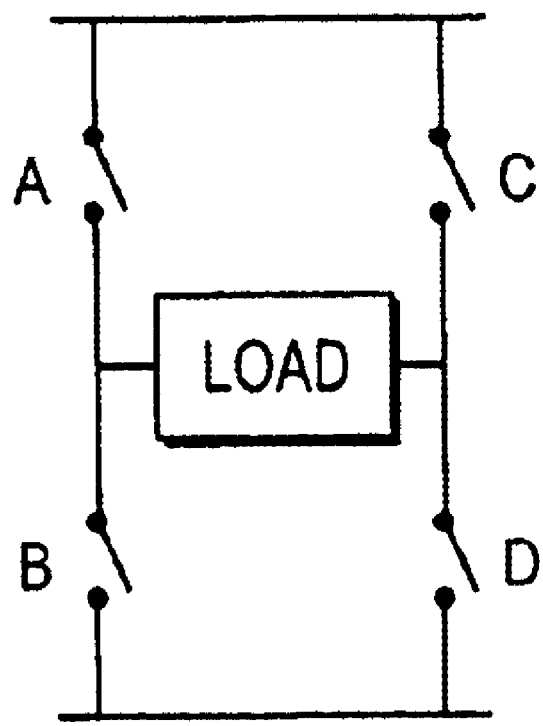
FIG. 1 is a diagram of a conventional H-bridge inverter topology.
Figure 2:
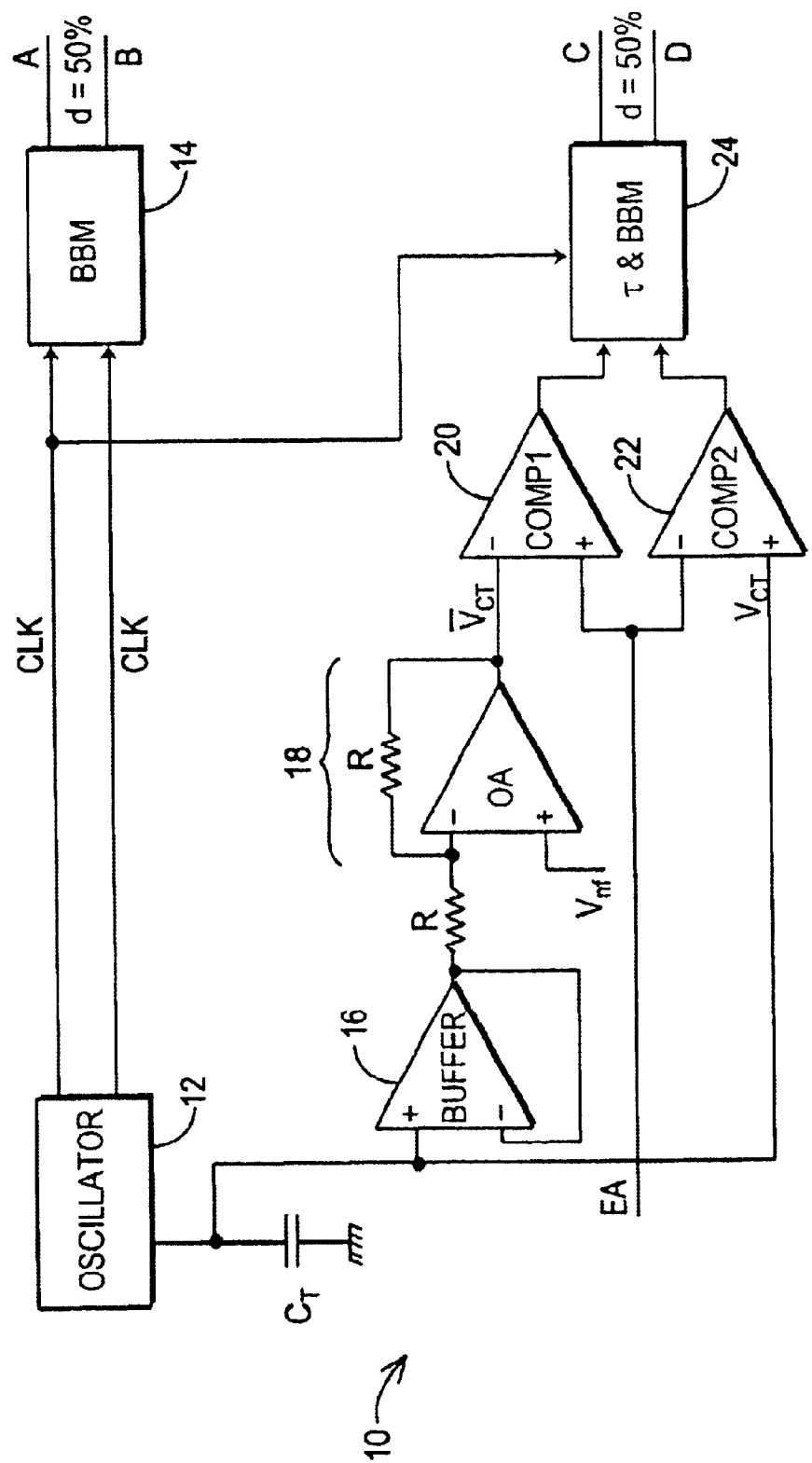
FIG. 2 is one exemplary driving circuit topology for generating phase-shifted pulse signals to control switches in an H-Bridge circuit.

FIG. 2 depicts a first exemplary driving circuit 10. An oscillator circuit 12 generates rectangular pulse driving signals CLK and CLK'. Pulses A and B are obtained by applying the CLK and CLK' through the break before make (BBM) block 14. These two pulses have 50% duty cycle. The BBM circuitry 14 has the function of not allowing the switches "A" and "B", and "C" and "D" to turn ON simultaneously, i.e. to short-circuit the supply voltage rails, and such circuitry is well understood in the art.

The oscillator capacitor, CT, is charged and discharged by a current source (not shown), so that its voltage is swinging between an upper limit (Vpeak) and a lower limit (Vvalley). The resulting signal is a sawtooth waveform. The charging and discharging currents can be equal or unequal. This signal is processed through a buffer 16 and a differential amplifier circuit 18 (comprising an operational amplifier OA and two equal resistors, R) to yield $V'_{CT}$, a reversed saw tooth signal.

$$V'_{CT}=2V_{ref}-V_{CT}$$

Where the Vref is set as:

$$V_{ref}=(V_{peak}-V_{valley})/2$$

Two comparators, COMP1 (20) and COMP2 (22) are used to obtain the drive signals C and D. COMP1 compares the reverse saw tooth signal, ($V'_{CT}$), with the slowly changing EA voltage. COMP2 compares the saw tooth signal ($V_{CT}$), with the slowly changing EA voltage. The EA signal is a DC signal generated by, for example, voltage and/or current feedback from a load driven by the H-Bridge circuit. EA is utilized to command the phase shift. Preferably, the value of EA is kept between $V_{peak}$ and $V_{valley}$, which represent the upper and lower peaks of the saw tooth signal. The intersection of the EA signal and the sawtooth signals generally defines the time shifted pulses of the C and D which in turn, in conjunction with B and D pulses determines the amount of power delivered by the switches to the load. The comparator outputs are applied to phase shift pulse generator circuit ζ and BBM 24 in order to obtain the second pair, phase shifted of pulses, C and D, which command the switches of the second diagonal. These pulses also have a d=50% duty cycle.

Figure 13A:
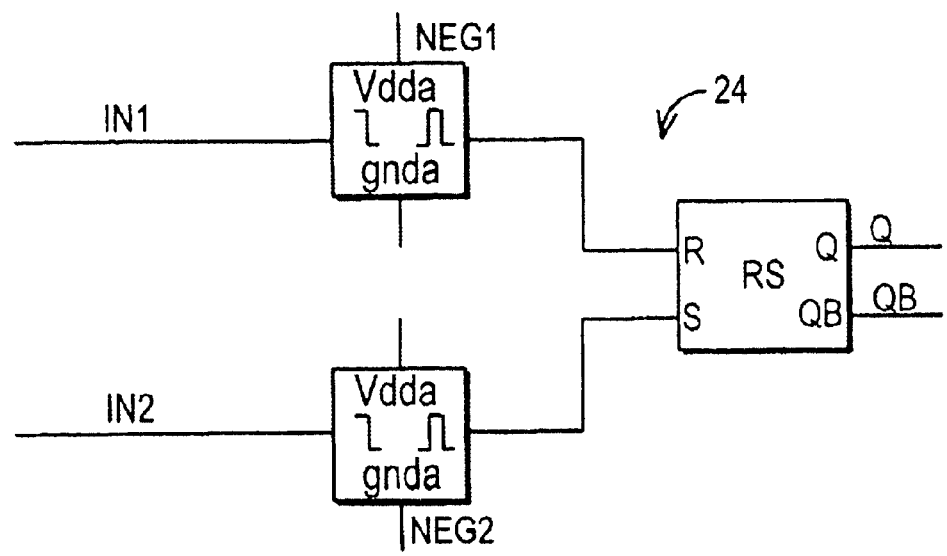
FIGS. 13A, 13B, and 13C depicts exemplary circuits for phase shifting and edge triggers.
Figure 13B:
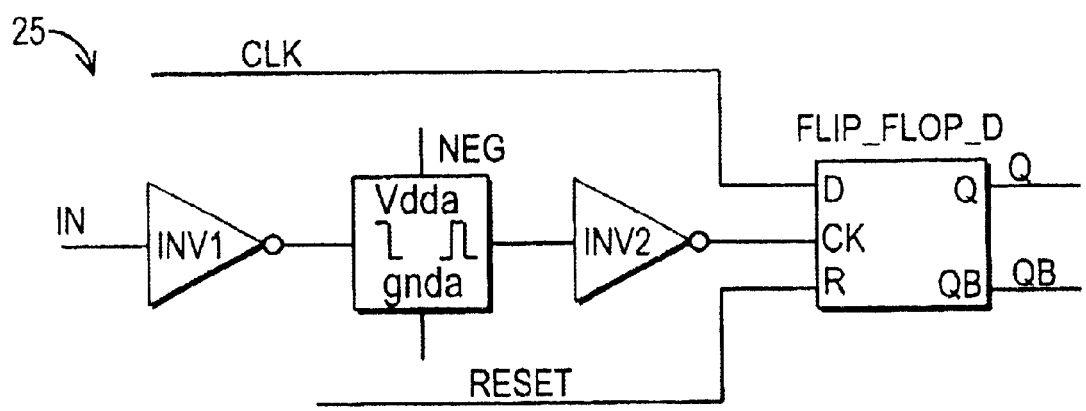
Figure 13C:
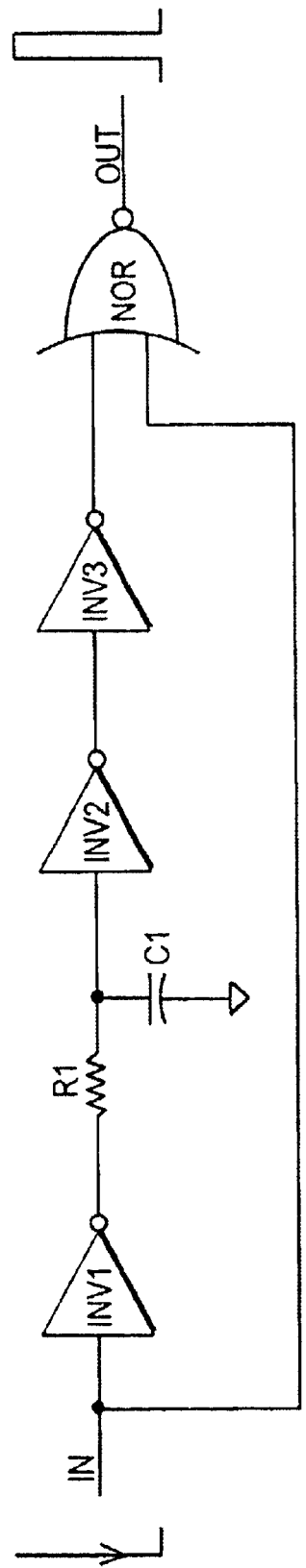

Those skilled in the art will recognize that break before make circuitry is well understood in the art. An exemplary circuit topology for the ζ & BBM block 24 is depicted in FIG. 13A. This circuit provides a phase shift between the driving signals A and D and driving signals B and C. The value of the phase shift ζ is determined by the feedback signal EA, as described above. The circuit receives the outputs of COMP1 and COMP2. The outputs of COMP1 and COMP2 are applied to NEG1 and NEG2 blocks, respectively. The output of COMP1 will changes states from high to low when $V'_{CT}$ exceeds the EA. When this change of state occurs, NEG1 block produces a short positive pulse signal. A similar operation occurs for COMP2 and NEG2 blocks. FIG. 13C depicts an exemplary circuit diagram of the NEG1 or NEG2 circuit blocks, and will be readily understood by those skilled in the art. An RS flip-flop receives the pulses generated by NEG1 and NEG2 and produces the complementary driving signals C and D at the output (Q and QB). The circuit 24 also prevents drive signals C and D from operating simultaneously. This exemplary embodiment of FIG. 2 has been implemented in the OZ960 inverter controller chipset manufactured by O2Micro International Limited.

B. Reversing the Command Level of Overlap Time

Figure 3:
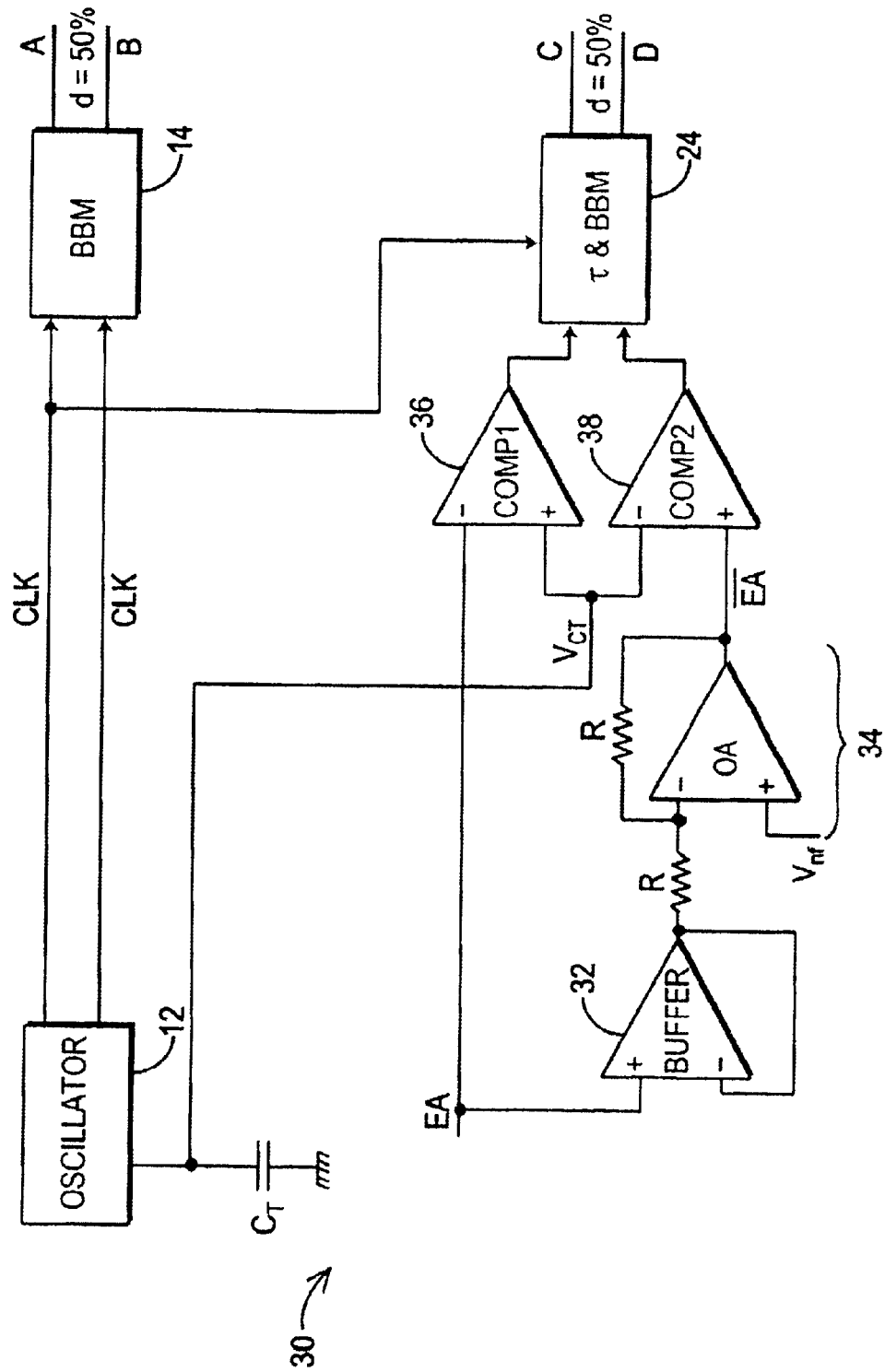
FIG. 3 is another exemplary driving circuit topology for generating phase-shifted pulse signals to control switches in an H-Bridge circuit.

FIG. 3 depicts a second exemplary driving circuit 30. As shown in FIG. 3, pulses A and B are obtained by applying the CLK and CLK' through the break before make (BBM) block 14. These two pulses have 50% duty cycle (d=50%). The BBM circuitry 14 has the function of not allowing the switches A and B, and C and D to turn ON simultaneously, i.e. to short-circuit the supply voltage rails. The oscillator capacitor, CT, is charged and discharged by a current source, so that its voltage is swinging between an upper limit (peak value) and a lower limit (valley value). The constant charging and discharging currents can be equal or unequal.

The continuous EA DC voltage is processed through a buffer 32 and a differential amplifier 34 to yield EA', the reversed slowly variable continuous voltage:

$$EA'=2V_{ref}-EA$$

Where $V_{ref}$ is set as:

$$V_{ref}=(V_{peak}-V_{valley})/2$$

Two comparators COMP1 36 and COMP2 38 are used to obtain the drive signals C and D. COMP1 compares the saw tooth signal with the slowly changing EA voltage. COMP2 compares the saw tooth signal, $V_{CT}$, with the slowly changes EA' voltage. Let EA be the output voltage of Error Amplifier of a feedback loop. EA commands the phase shift. The value of EA is kept between $V_{peak}$ and $V_{valley}$. The comparator outputs are applied to phase shift pulse block, ζ and BBM 24 in order to obtain the second pair of phase shifted pulses, C and D, which command the switches of the second diagonal. These pulses also have a d=50% duty cycle. The description of the block 24 is set forth above.

This exemplary embodiment of FIG. 3 has been implemented in the OZ9001 chipset manufactured by O2Micro International Limited.

C. Double-period Saw Tooth Method

Figure 4:
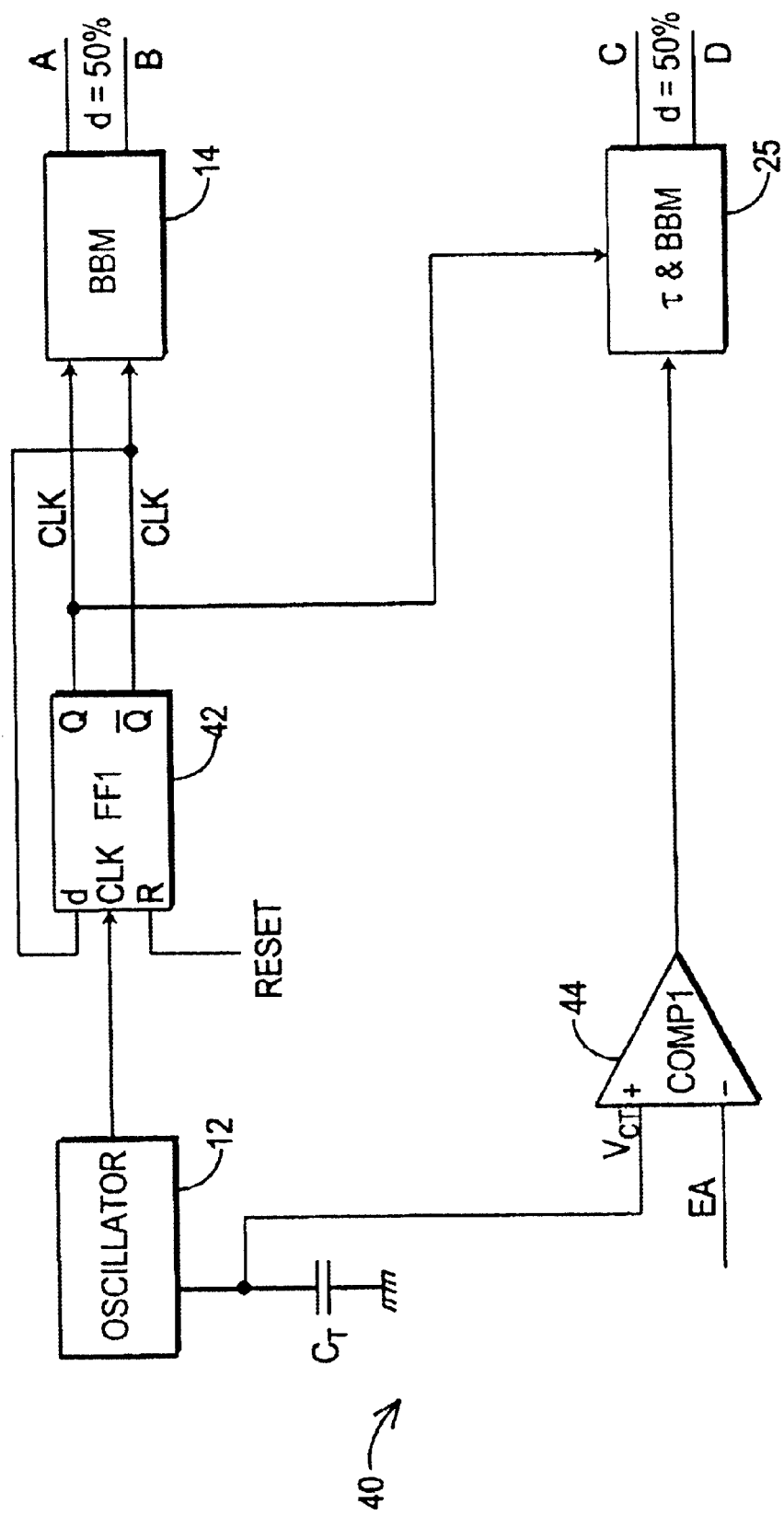
FIG. 4 is another exemplary driving circuit topology for generating phase-shifted pulse signals to control switches in an H-Bridge circuit.

FIG. 4 depicts another exemplary driving circuit 40. In this embodiment, as shown in FIG. 4, the oscillator signal period is multiplied by two using the flip-flop circuitry FF1 42. Pulses A and B is obtained by applying the CLK and CLK' through the break before make (BBM) block 14. These two pulses have 50% duty cycle. The BBM circuitry has the function of not allowing the switches A and B; C and D to turn ON simultaneously, i.e. not to short-circuit the supply voltage rails.

The oscillator capacitor, CT, is charged and discharged by current sources, so that its voltage waveform is swinging between an upper limit (peak value) and a lower limit (valley value). The charging and discharging currents can be equal or unequal. One comparator, COMP1 44, is used to obtain drive signal C and D. It compares the saw tooth $V_{CT}$ signal to the EA voltage. Let EA be the output voltage of the Error Amplifier of a feedback loop. EA commands the value of the phase shift. The value of EA is kept between $V_{peak}$ and $V_{valley}$. The output of the comparator is applied to the phase shift pulse block 25 (ζ and the BBM block 25) in order to obtain the second pair of phase shifted pulses, C and D, which command the switches of the second diagonal. These pulses also have a d=50% duty cycle.

Those skilled in the art will recognize that break before make circuitry is well understood in the art. An exemplary circuit topology for the ζ & BBM block 25 is depicted in FIG. 13B. This circuit provides a phase shift between the driving signals A and D and driving signals B and C. The value of the phase shift ζ is determined by the feedback signal EA, as described above. The comparator 44 changes states from low to high when the Vct signal exceeds the EA signal. A NEG block (FIG. 13B) receives the output of the comparator via INV1 and produces a pulse signal when the output of the comparator changes states from low to high. This process is described above with reference to FIG. 13C. A D-type flip flop is used to generate the complementary C and D signals, using the output of the NEG block via INV2 as a clock input, the clock signal and a reset signal. This embodiment has been implemented in the OZ961 inverter controller manufactured by O2Micro International Limited.

D. Half-period Saw Tooth Method

Figure 5:
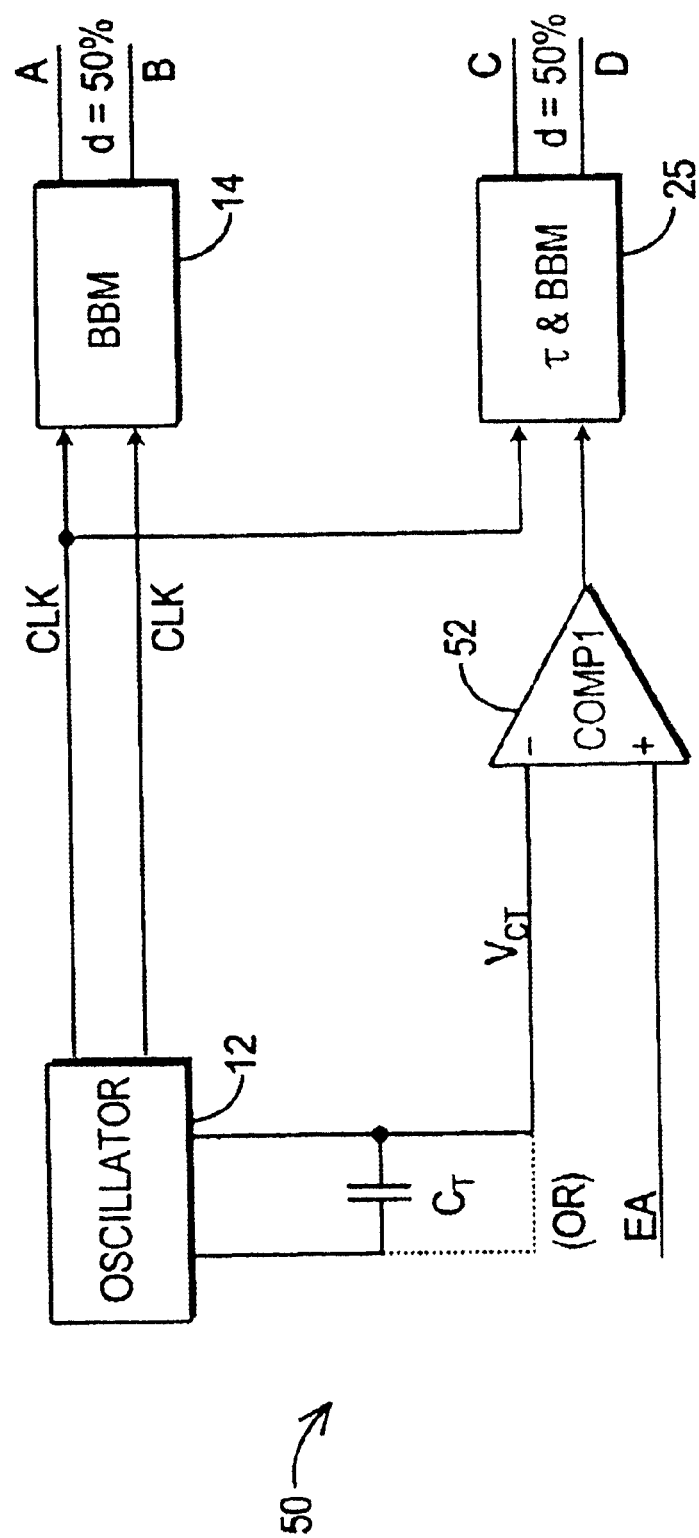
FIG. 5 is another exemplary driving circuit topology for generating phase-shifted pulse signals to control switches in an H-Bridge circuit.

FIG. 5 depicts another exemplary driving circuit 50. In this embodiment, as shown in FIG. 5, the oscillator capacitor $C_T$ is floating and each side of the capacitor is alternatively charged and discharged by current sources, so that its voltage is swinging between upper limit (peak value) and lower limit (valley value). This means that during one half period one side is charged and discharged while the second side is kept at constant voltage. The next half period the function is vice versa.

Pulses A and B are obtained applying the CLK and CLK' through the break before make (BBM) block 14. These two pulses have d=50% duty cycle. The BBM circuitry has the function of not allowing the switches A and B; C and D to turn ON simultaneously, i.e. not to short-circuit the supply voltage rails. Refer to FIG. 5 COMP1. This comparator is used to obtain drive signal C and D. It compares the saw tooth $V_{CT}$ signal of one side of the capacitor to the slowly changing EA voltage. Let EA be the output voltage of Error Amplifier of a feedback loop. The value of EA is kept between $V_{peak}$ and $V_{valley}$. The intersection of EA signal and the sawtooth signals defines the time shifted pulses of C and D. The output of the comparator is applied to phase shift pulse former, ζ and BBM in order to obtain the second pair of phase shifted pulses, C and D, which command the switches of the second diagonal. These pulses also have a d=50% duty cycle.

E. Double Period Opposite Shifting Pulses Method

Figure 14:
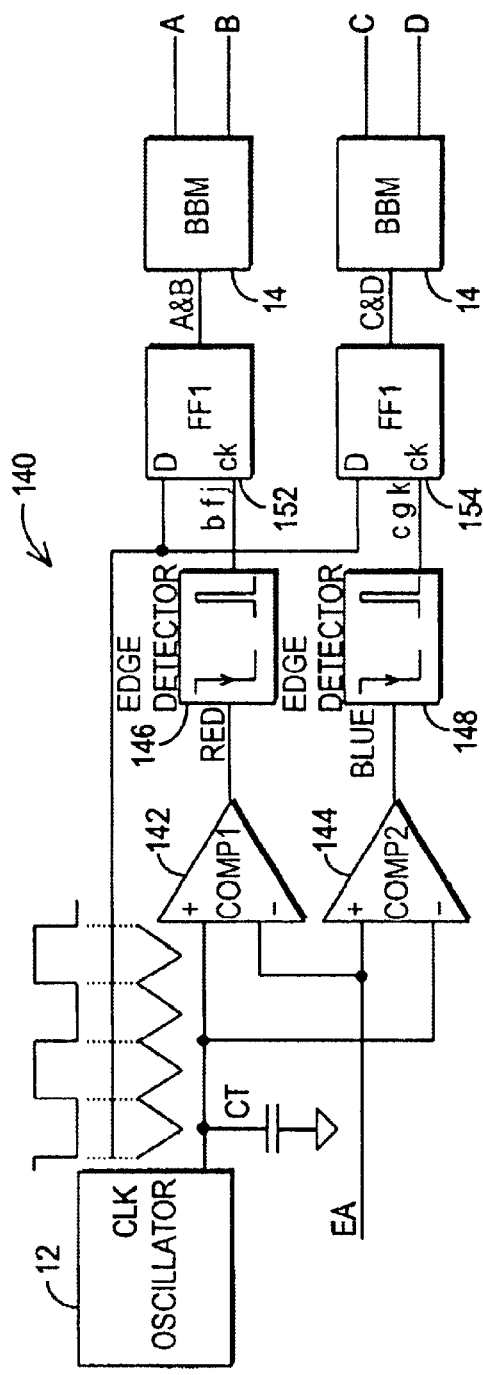
FIG. 14 depicts another exemplary driving circuit topology for generating phase-shifted pulse signals to control switches in an H-Bridge circuit.

FIG. 14 depicts another exemplary driving circuit 140. As shown, the oscillator 12 generate symmetrical saw tooth, CT, and rectangular pulses have 50% duty cycle. The oscillator capacitor is charged and discharged by constant current sources, so that its voltage is swinging between an upper limit (peak value) and a lower limit (valley value). The period of rectangular pulses (CLK) is twice the saw tooth period (double). Let EA is the output voltage of Error Amplifier of a feedback loop. One comparator, COMP1, is used to obtain drive signal A and B. It compares the saw tooth signal to the slowly changing EA voltage. The non-inverting input of COMP1 is connected to CT and the inverting input to EA. An edge detector 146 receives the output of the comparator 142 and generates a clock pulse "CK" for FF1 flip-flop upon a transition from high to low.

Figure 16:
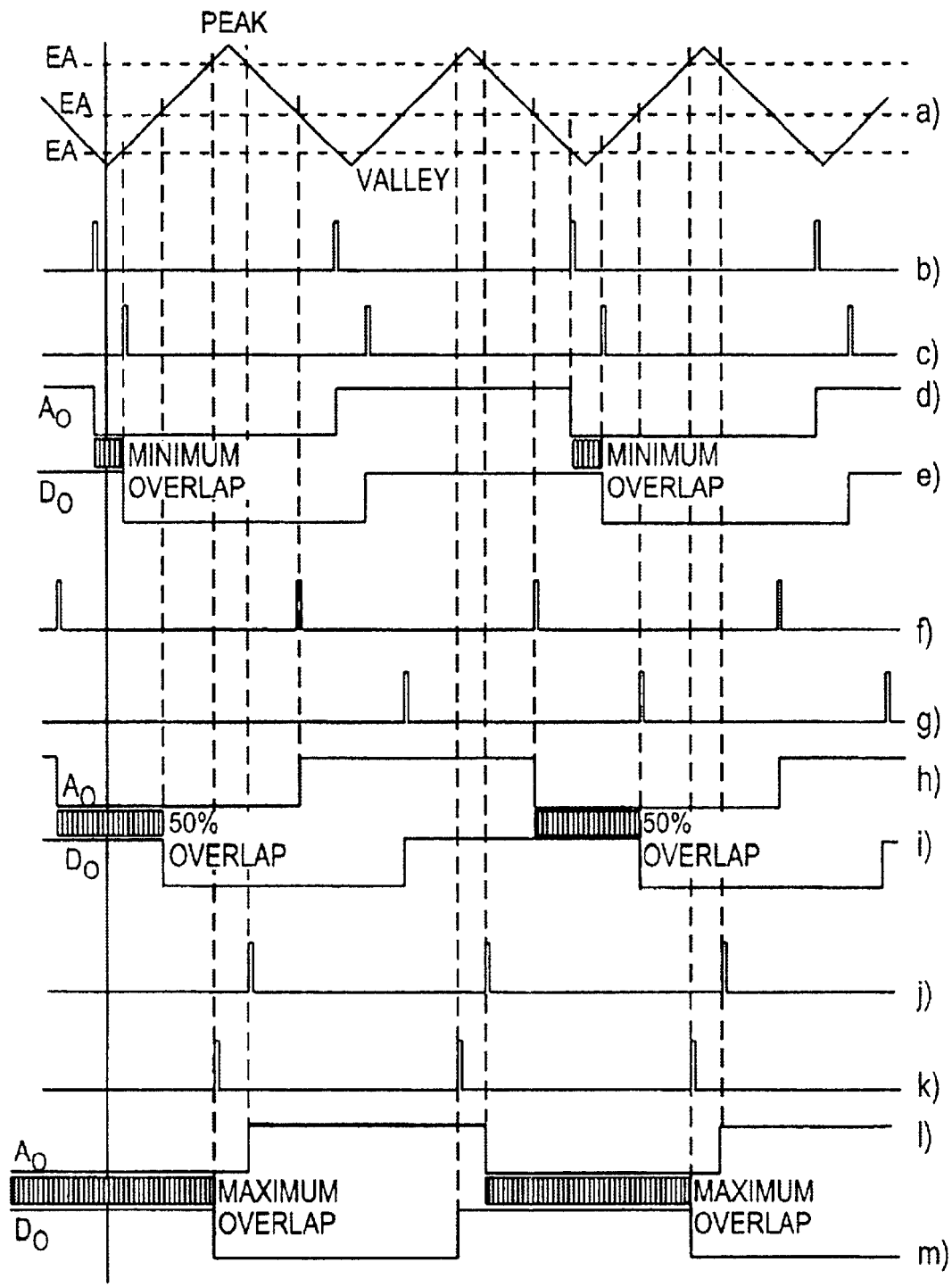
FIGS. 16a–16m depict timing diagrams for the circuits of FIGS. 14 and 15.

As depicted in FIG. 16a, EA is kept between $V_{peak}$ and $V_{valley}$. FIG. 16 depicts three cases: for EA value close to the valley value of saw tooth (16b–e), EA equal to the middle value (16f–i) and under a peak value of saw tooth (16j–m). The clock pulse "CK" for FF1 flip-flop 152 are illustrate on timing diagram 16b, 16f and 16j. For this "RED" channel these pulses are shifted on the left side if EA value increase from the valley to the peak value. The term "left shifted" or "right shifted" is refer to saw tooth (as timing reference). Using these shifted pulses and CLK pulses; FF1 flip-flop will provide "A&B" 50% duty cycle pulses.

The break before make (BBM) block has the function of not allowing the vertical switches "A" and "B" (or "C" and "D") to turn ON simultaneously, i.e. not short-circuit the supply voltage rails. The BBM 14 provides "A and "B" non-overlapping pulses for A and B switches.

In order to obtain the second pair of phase-shifted pulses, C and D, which command the switches of the second diagonal, the second channel, BLUE, use the same blocks: one comparator (COMP2) one EDGE DETECTOR 148, one flip-flop FF2 156, and one BBM 14. The inputs of COMP2 are connected reverse as for COMP1, i.e. the non-inverting input is connected to EA while the inverting input to CT. An edge detector 148 receives the output of the comparator 144 and generates a clock pulse "CK" for FF2 flip-flop upon a transition from high to low. As shown in FIG. 16a, EA is kept between $V_{peak}$ and $V_{valley}$. The drawing illustrates three cases: for EA value close to the valley value of saw tooth, EA equal to the middle value and under a peak value of saw tooth. The clock pulse "CK" for FF2 flip-flop are illustrate on timing diagram 16c, 16g and 16k. For this "BLUE" channel these pulses are shifted on the right side if EA value increase from the valley to the peak value. The FF2 flip-flop will provide "C&D" 50% duty cycle pulses. The BBM circuitry has the function of not allowing the switches "C" and "D" to turn ON simultaneously, i.e. not to short-circuit the supply voltage rails.

Figure 15:
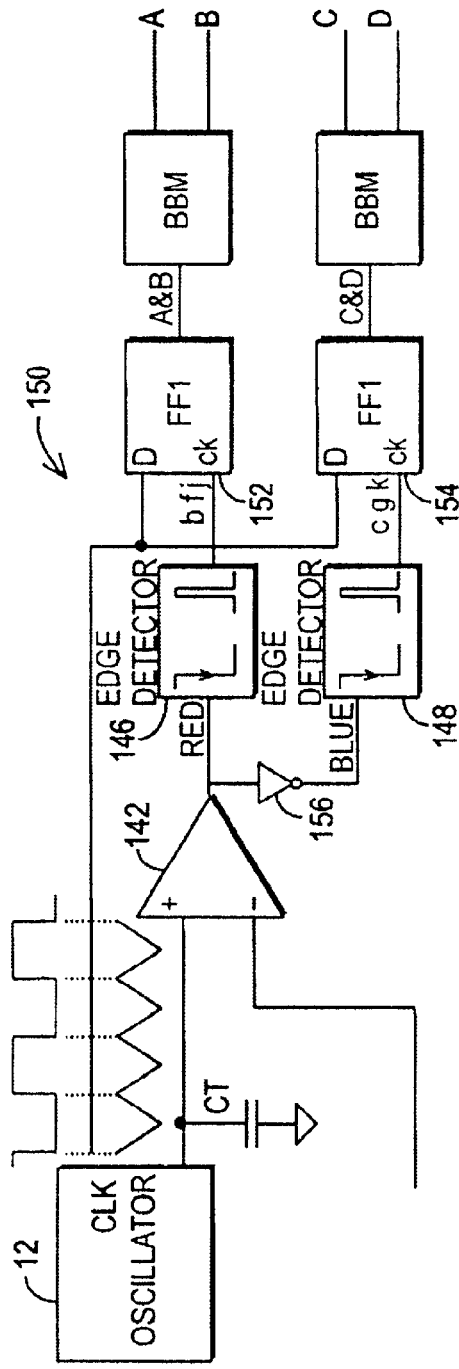
FIG. 15 depicts exemplary driving circuit topology for generating phase-shifted pulse signals to control switches in an H-Bridge circuit.

FIG. 15 depicts another circuit diagram 150. COMP2 is omitted and between the RED and BLUE wires an inverter gate 156 is connected. This circuit functions similarly to the earlier description of circuit 140. If the gate is a NOR gate or another type the C and D output pulses are dependent.

As shown in FIGS. 16d, 16e; 16h, 16i; and 16l, 16m for A and D pulses which command the switches A (PMOS transistor) and D (NMOS transistor), (one diagonal of the bridge circuit), the current generated varies from minimum value (minimum overlap) to maximum value (corresponding to maximum overlap). The overlap for A/D diagonal increase from minimum to maximum, symmetrical to the left and to the right of one CT valley value. The B and C pulses command the switches B respectively C and they are generated symmetrical to the next CT valley value, i.e. on each valley of CT one diagonal allow the current to flow through load.

The exemplary embodiment of FIG. 14 has been implemented in the OZ964 and FIG. 15 in the OZ964B, both of which are manufactured and sold by O2Micro International Limited.

II. Pulse Width Modulated Techniques

PWM Generator for Full and Half Bridge Inverter Switches

Figure 6:
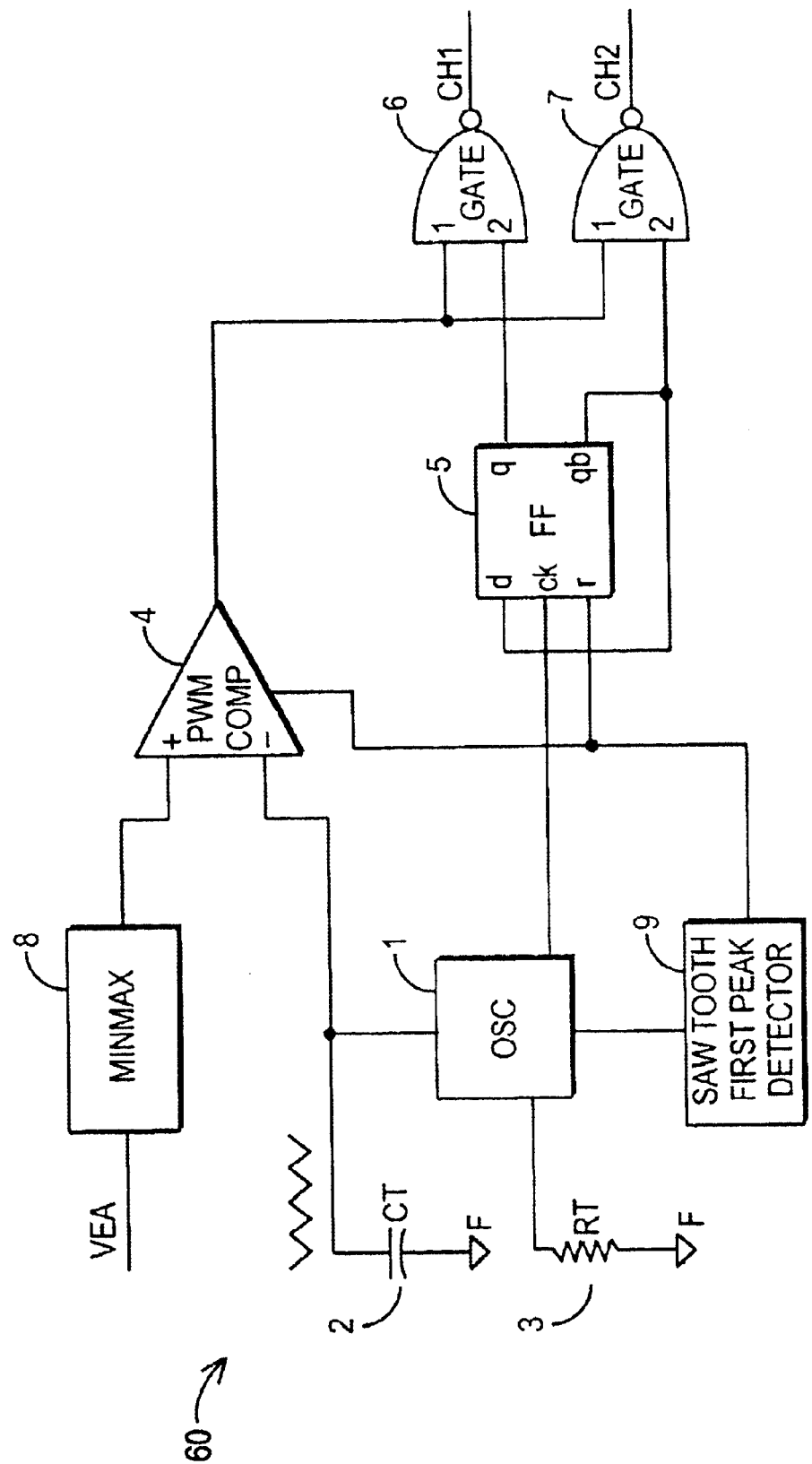
FIG. 6 is one exemplary PWM signal generator circuit.

FIG. 6 depicts a PWM generator circuit 60 according to the present invention the principle of PWM generator. In this embodiment, the PWM circuit 60 generates periodical PWM signal symmetrical to the VALLEY (or PEAK) of a sawtooth waveform. The OSCILLATOR (1) and its associated component $C_T$ capacitor (2) and $R_T$ (3) resistor provide a symmetrical sawtooth waveform to the PWM COMPARATOR (4) input. The $V_{EA}$ voltage (Error Amplifier output voltage) is applied to the second input of PWM comparator, via the MINMAX block (8). At the output of PWM comparator the pulses are Width Modulated as a function of voltage $V_{EA}$. These pulses and the pulses obtained at the FLIP-FLOP (5) outputs, "Q" and "QB" are combined by gate (6) and gate (7). In the exemplary embodiment, but not required, the output of these gates, "CH1" and "CH2", are disabled until the SAWTOOTH FIRST PEAK DETECTOR (9) enables the PWMCOMP (4) and the FLIP-FLOP (5). This can prevent no-predictable transient status of the outputs ("CH1" and "CH2") during the rising time of "$C_T$" voltage from zero to VALLEY-PEAK operating range.

This embodiment has been implemented in the OZ9RR; OZ9RR2 and OZ9RR4 inverter controller manufactured by O2Micro International Limited.

The MINMAX block 8 includes a "window" function. Two reference voltages are applied 1o this block: MIN. voltage and MAX. voltage (the MIN value is lower than the MAX, value): The MINMAX block logically operates as follows:

If $V_{EA}$ is lower than MIN. voltage than the output voltage of this block is equal to MIN. value;

If $V_{EA}$ is higher than the MIN voltage but lower than MAX, voltage than the output voltage is equal to $V_{EA}$;

If $V_{EA}$ is higher than the MAX.voltage, than the output voltage of MINMAX block is equal to MAX.

Using the MINAX block the EA signal is kept between MIN and MAX voltage. The Min and MAX voltage can be equal to the valley and the peak of saw tooth.

Figure 7:
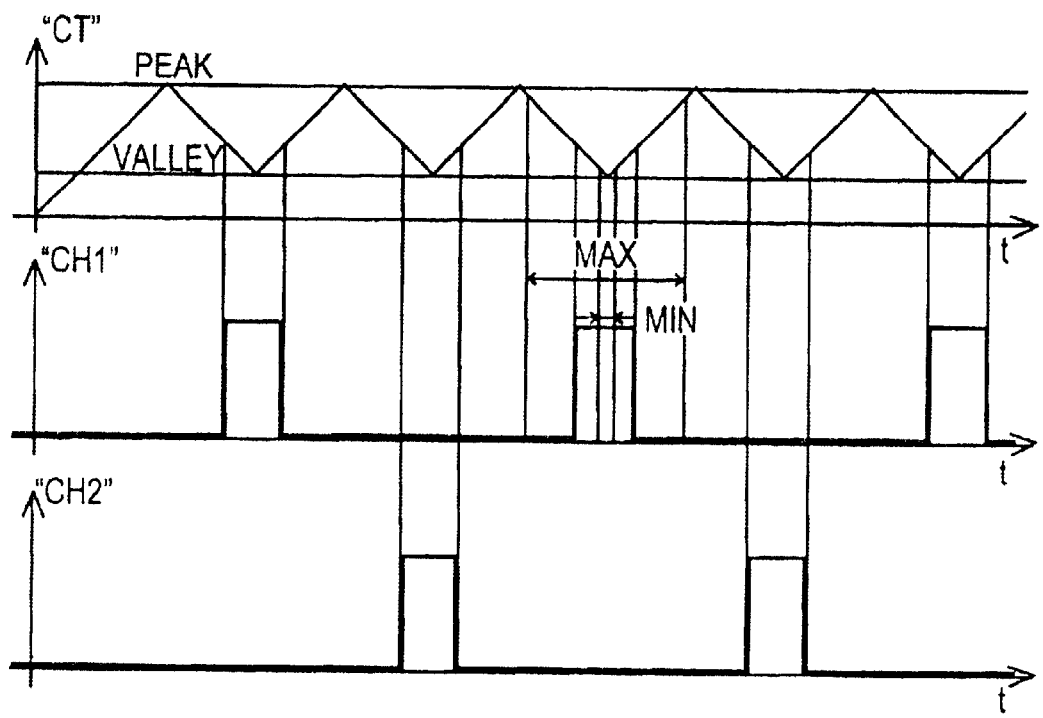
FIG. 7 is a timing diagram for the circuit of FIG. 6.
Figure 8:
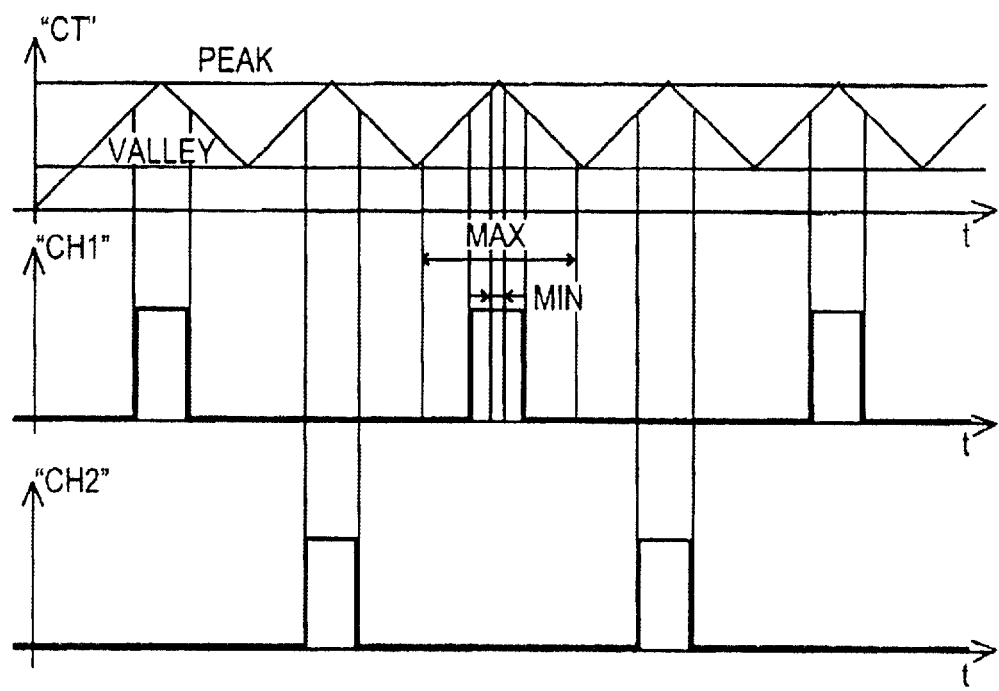
FIG. 8 is another timing diagram for the circuit of FIG. 6.

The circuit can generate PWM pulses symmetrical to the VALLEY of the saw tooth signal. "CH1" and "CH2" pulses are interleaved in time, as shown in FIG. 7. Alternatively, the "CH1" and "CH2" pulses can be generating symmetrical to the PEAK of the saw tooth, as shown in FIG. 8.

Figure 9:
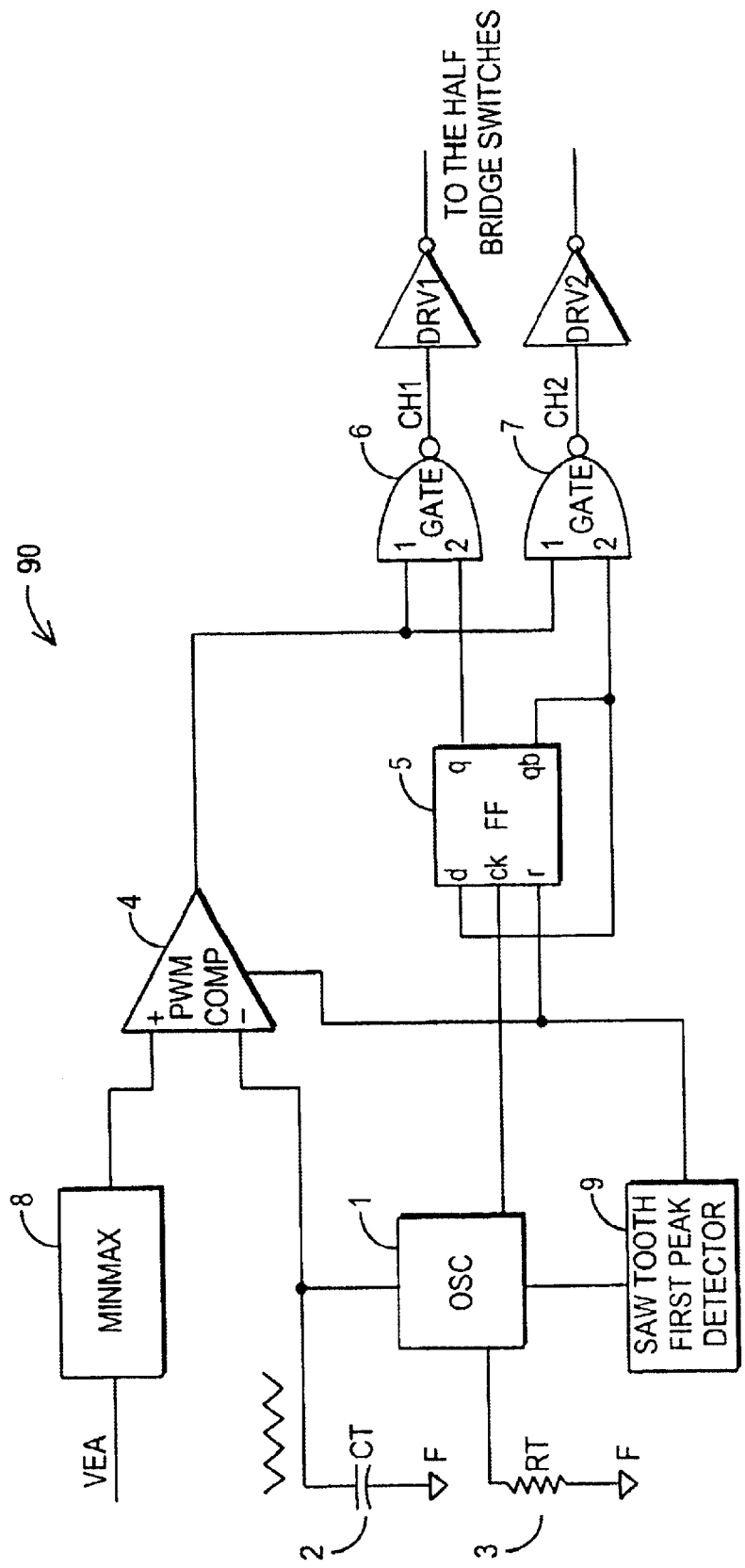
FIG. 9 is another exemplary PWM signal generator circuit.

Adding adequate power drivers to the basic schematic shown in FIG. 9 for the switches used in half bridge inverter configuration, the schematic 90 shown in FIG. 9 generates PWM pulses to these switches, function of $V_{EA}$ voltage.

Figure 10:
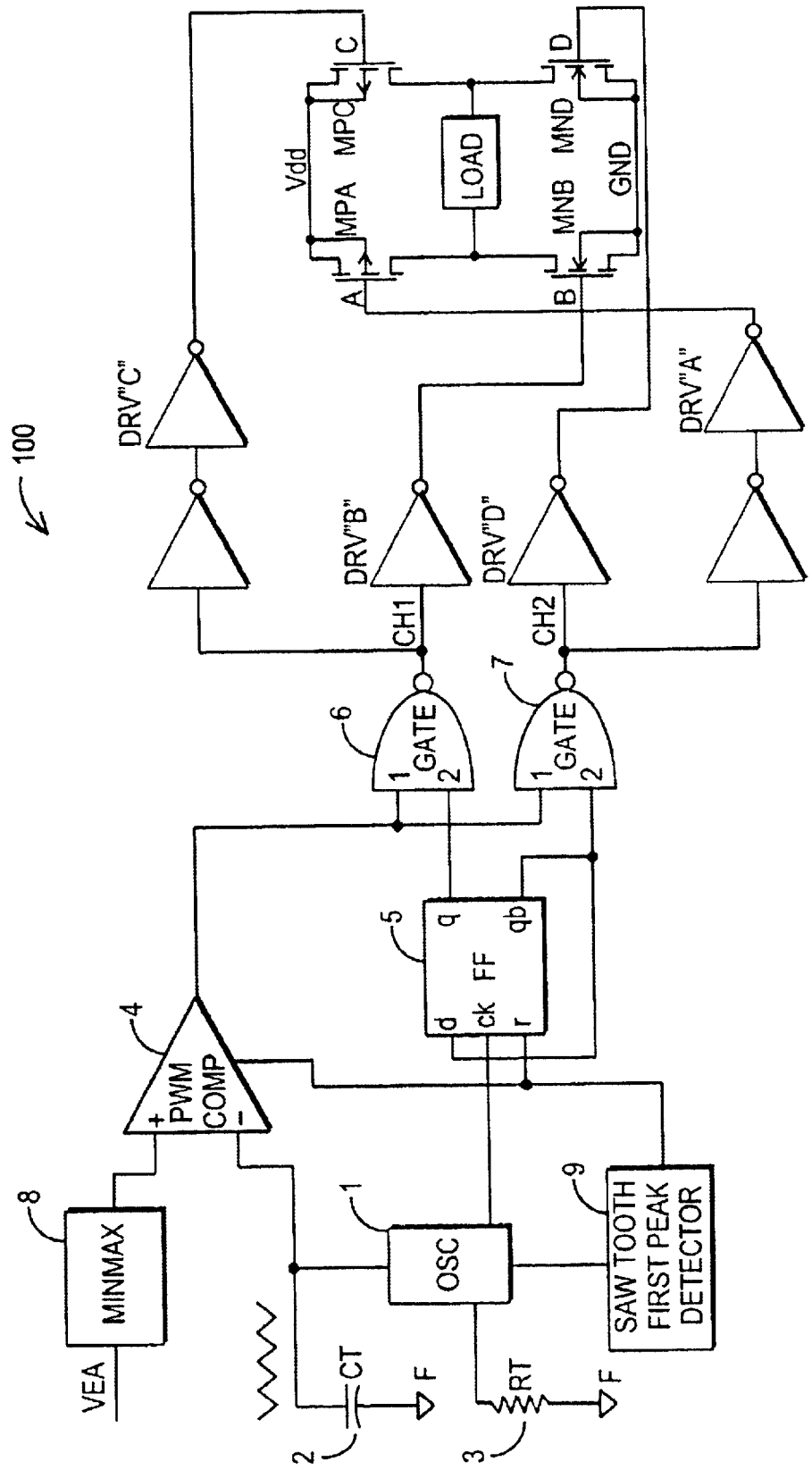
FIG. 10 is another exemplary PWM signal generator circuit.

A full bridge configuration 100 is shown in FIG. 10, with the addition of inverters and adequate power drivers (DRV), as is well understood in the art. In this case the bridge configuration consists of two NMOS and two PMOS transistors. The $V_{EA}$ is clamped HIGH at a value lower than PEAK value. In this manner, before make (BBM) circuitry (described above) can be omitted. This configuration is called "hard switching" method, as is understood in the art, and the energy accumulated in the load is discharged through body diode (not shown) of MOS transistors.

Figure 11:
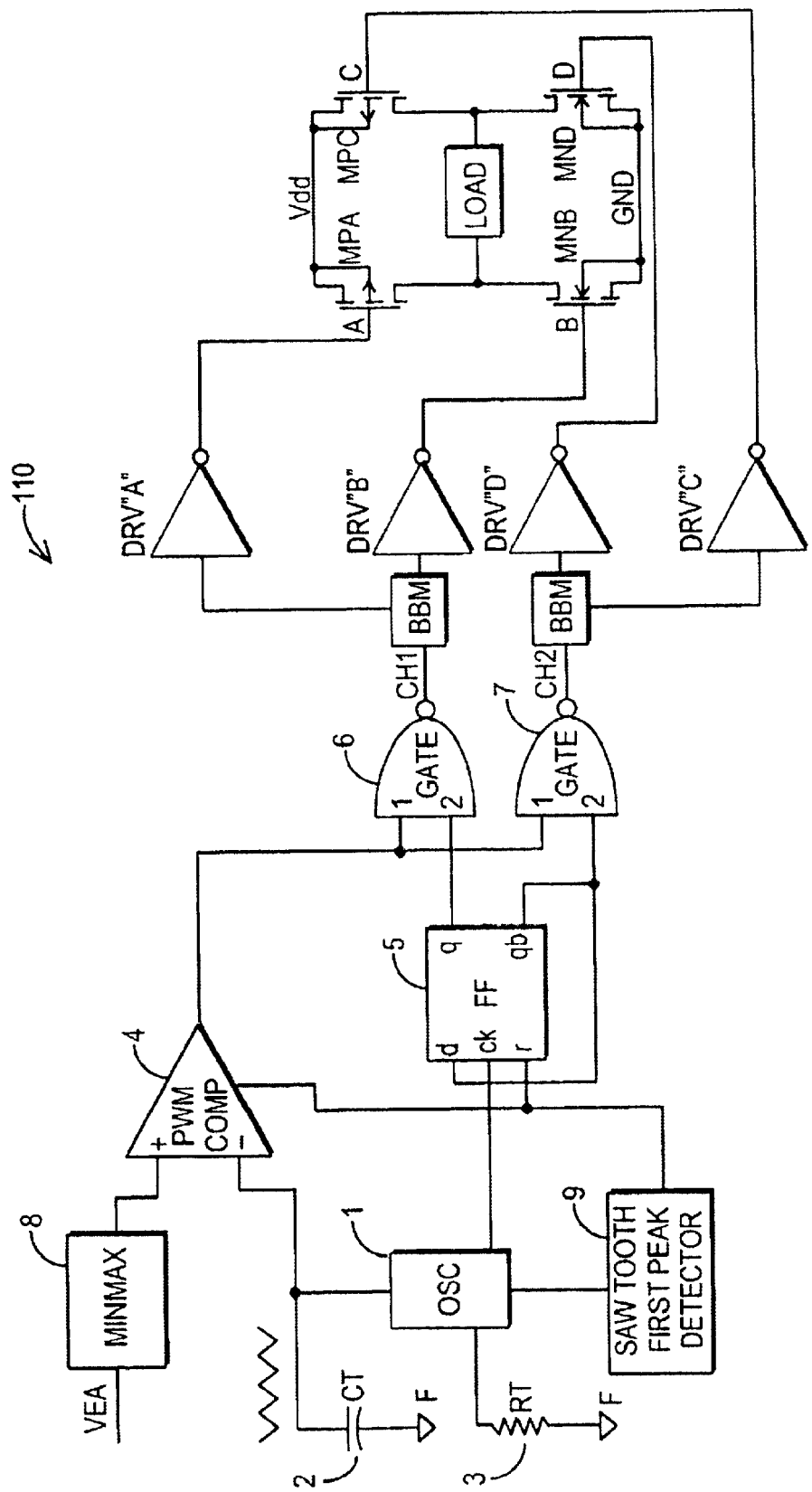
FIG. 11 is another exemplary PWM signal generator circuit.
Figure 12:
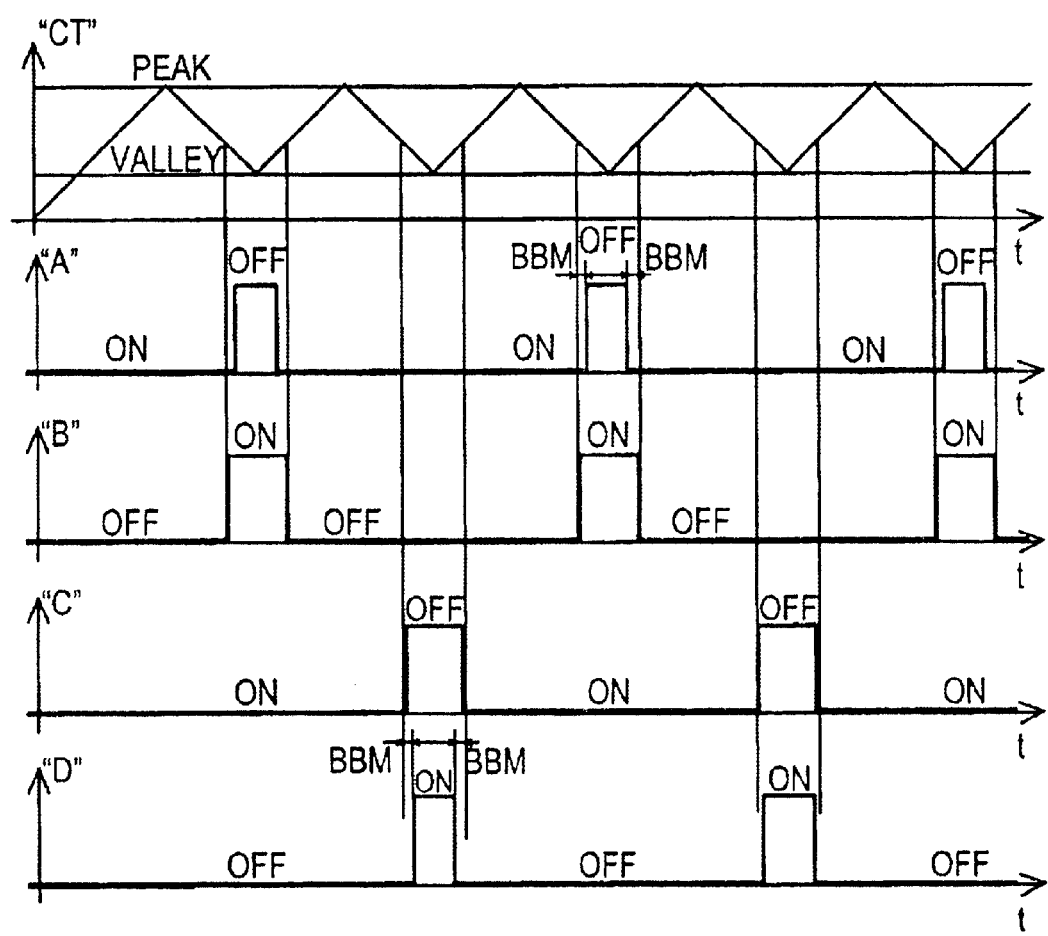
FIG. 12 is a timing diagram for the circuit of FIG. 11.

A "soft switching" application for an "H" bridge configuration 110 using two NMOS and two PMOS transistors is shown in FIG. 11. Introducing two BBM blocks (as shown), the switching sequence of switches MPA; MNB; MPC and MND perform the following functions: allows the current to flow in the MPA-MND diagonal, MPA and MPC discharge the energy accumulated in load, allows the current to flow in MPC-MNB diagonal; and MPA MPC discharges the energy accumulated in load. FIG. 12 shows an example of timing diagram for the circuit 110 of FIG. 11.

Those skilled in the art will recognize numerous modifications to the present invention, and all such modifications are deemed within the spirit and scope of the present invention, as defined by the claims.

What is claimed is:

1. An inverter controller comprising a drive circuit that generates a plurality of switch drive signals by reversing the command level of an error signal, said drive circuit comprising:

an oscillator circuit generating a first and second complimentary clock pulses and a sawtooth signal;

a break-before-make circuit receiving said first and second complimentary clock pulses and generating a first and second switch drive signals;

a first comparator comparing an error signal and said sawtooth signal, and a second comparator comparing a compliment of said error signal and said sawtooth signal; and a phase generating circuit receiving the outputs of said first and second comparators and generating a third and fourth drive switch drive signals, said third and fourth switch drive signals having a phase with respect to said first and second switch drive signals, respectively, said phase determined by said error signal.

2. An inverter controller as claimed in claim 1, said drive circuit further comprising a differential amplifier circuit receiving said error signal and a reference signal and generating said compliment of said error signal.

3. An inverter controller as claimed in claim 1, wherein said error signal is feedback signal indicative of a current or voltage condition at a load coupled to said inverter controller.

4. An inverter controller as claimed in claim 1, said switch drive signals controlling the conduction states of switches associated with a full bridge inverter.

* * * * *